Figure 1:
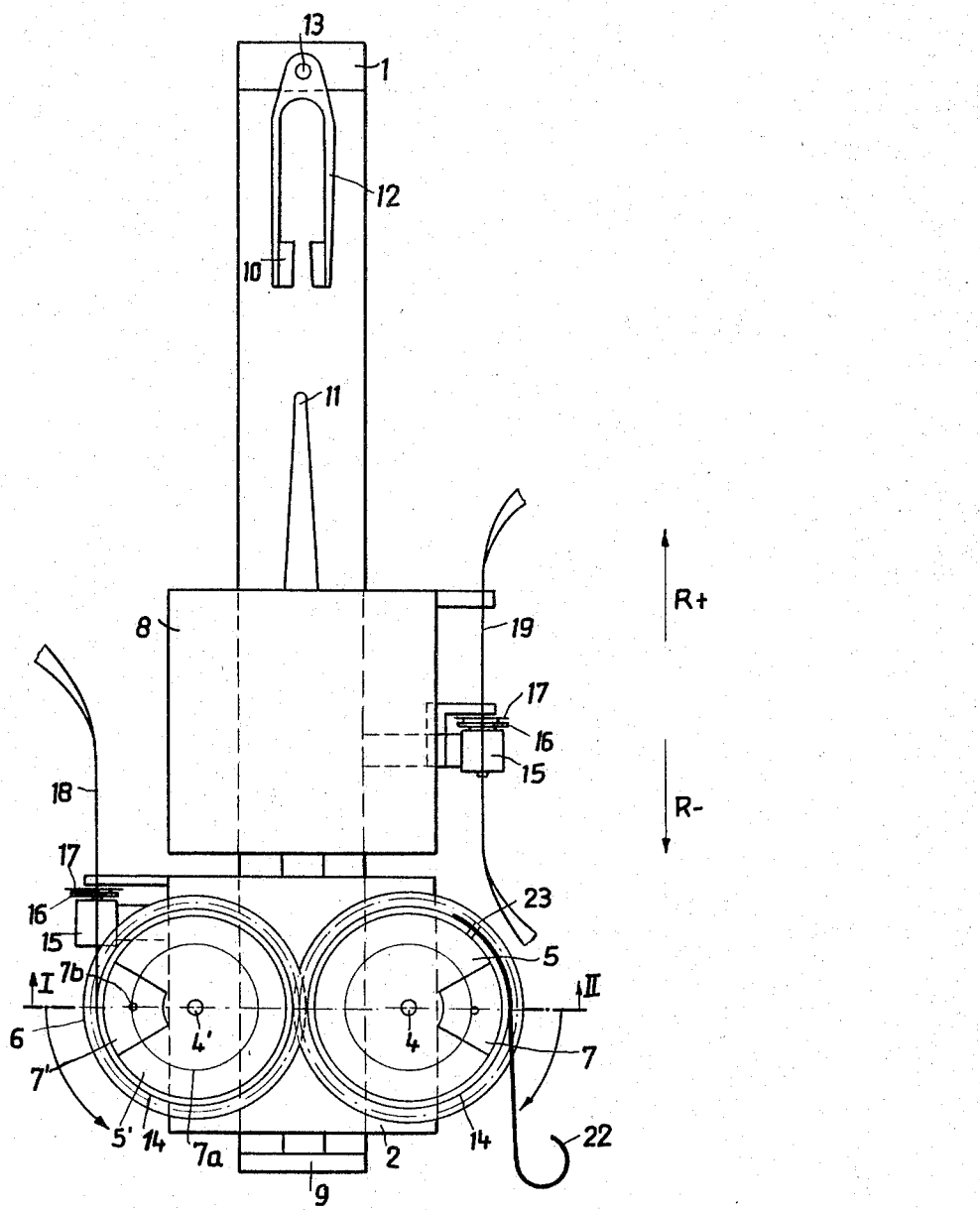

Inventor:
FRIEDRICH MULKA

June 6, 1967  F. MULKA  3,323,229
ENERGY INTERCONVERSION DEVICE
Filed May 25, 1965  6 Sheets-Sheet 3

Inventor:
FRIEDRICH MULKA
By
AGENT

Inventor:
FRIEDRICH MULKA

United States Patent Office 3,323,229
Patented June 6, 1967

3,323,229
ENERGY INTERCONVERSION DEVICE
Friedrich Mulka, Mallinckrodtstrasse 17,
Paderborn, Germany
Filed May 25, 1965, Ser. No. 458,702
5 Claims. (Cl. 35—19)

This invention relates to a teaching device useful in the teaching of physics and mechanics. More particularly, this invention relates to a device for showing the relation between the potential energy of inertia of a revolving mass and the energy of acceleration of a body in a straight line, i.e. the relation between centrifugal force and force causing acceleration in a linear direction.

In the teaching of physics and mechanics, it is often preferred to use the experimental method, whereby demonstrators or teams of students conduct experiments involving the careful measurement of physical quantities, and from the results of these experiments demonstrate the truth of physical principles. The widespread use of the experimental method has led to the search for teaching devices which are capable of demonstrating physical and mechanical relationships and which can be easily operated by students and the like.

Accordingly, it is an object of the present invention to provide a device capable of demonstrating the relation between the potential energy of inertia of rotating bodies and the energy of acceleration of a body in a straight line.

It is another object of the present invention to provide such a device equipped with measuring devices, whereby the centrifugal force of the rotating bodies and the force of acceleration causing a second body to accelerate in a straight line as a result of the action of said rotating bodies can be measured.

Other objects will become obvious from the following description.

The inventive device comprises a system of two revolving masses having potential energy of inertia due to their revolution. These masses are mounted on a carriage which is capable of linear motion, and some of their potential energy of inertia is converted to linear motion of the carriage. The motion of the carriage then sets into motion a second adjacent carriage. The velocity of the revolving masses and the motion of the second carriage can then be measured, and the relationship between the two forms of energy can then be derived from these measurements.

The invention therefore consists in a device for the interconversion of energy forms which comprises a horizontal path; a first carriage adapted to move along said path in either of two opposite directions with relatively little friction, a stop member rigidly secured to said path, a first end of said first carriage being initially positioned adjacent to said stop member whereby to prevent the movement of said first carriage in a first one of said two directions; two equal masses mounted upon said first carriage for free revolution relative to said carriage in a horizontal plane about centres of revolution lying in a line perpendicular to said two opposite directions, said centres of revolution being spaced so that said two masses have equal, non-intersecting, circles of revolution, said two masses being connected by gearing whereby when one mass revolves about its centre of revolution in a clockwise direction the other mass revolves about its centre of revolution in a counterclockwise direction with a velocity equal to that of the first mass; a second carriage adapted to move along said path in either of said two opposite directions, said second carriage being initially positioned adjacent to the end of said first carriage remote from said first end; and energy supplying means capable of initiating revolution of at least one of said two masses.

Figure 2:
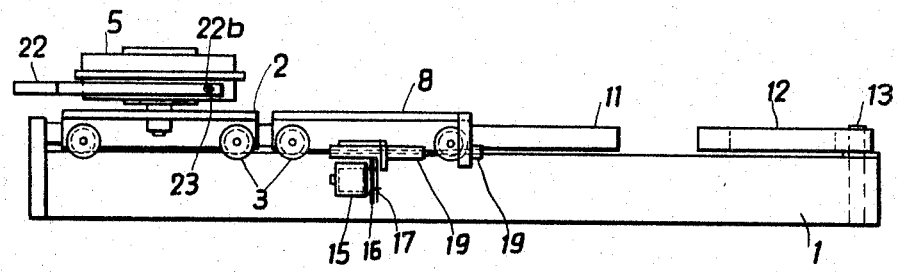
Figure 3:
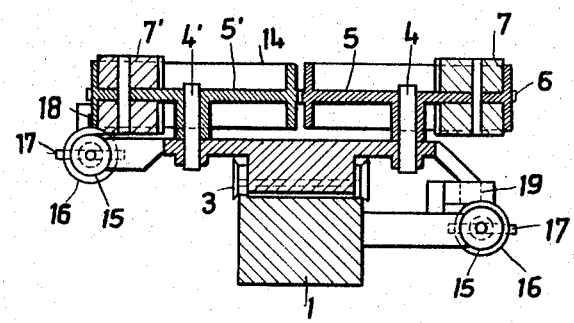
Figure 4A:
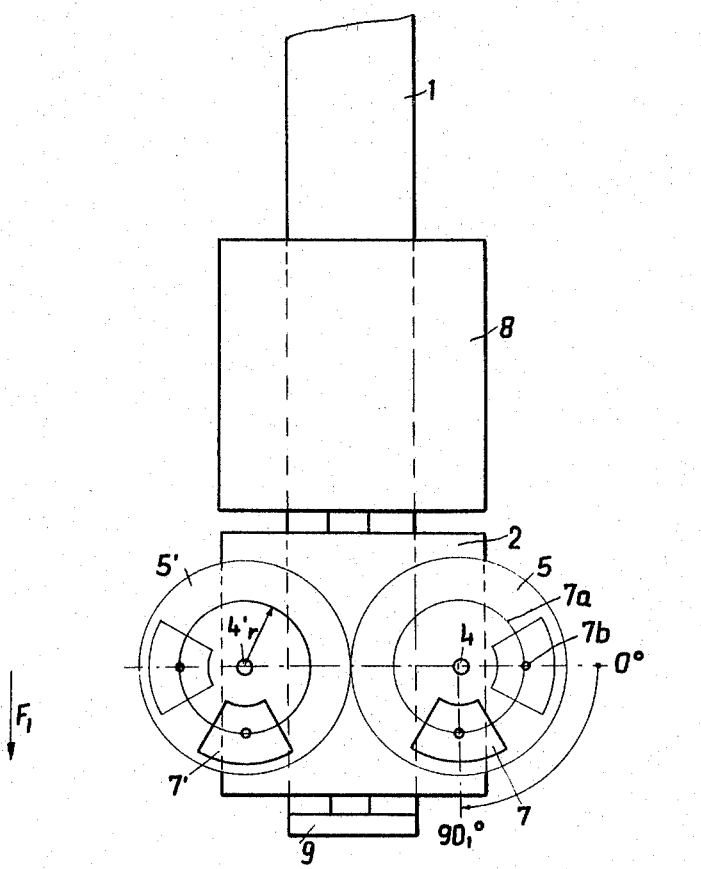
Figure 4B:
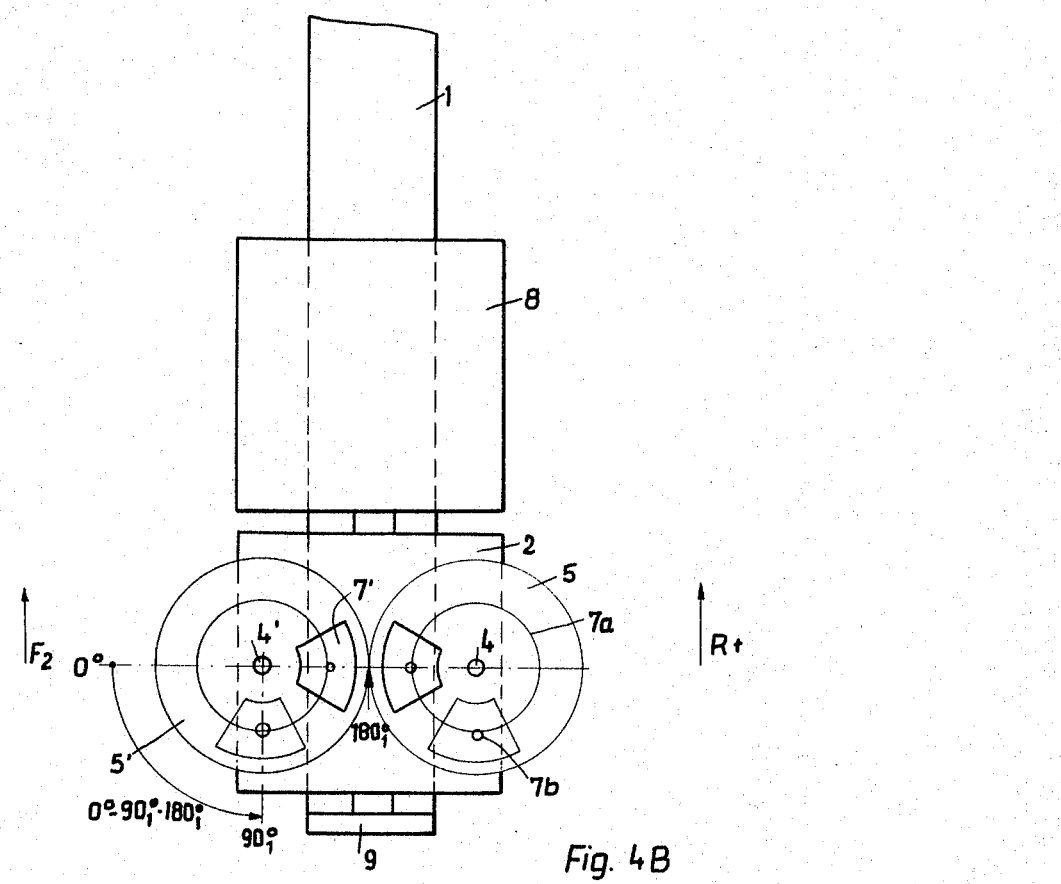
Figure 4C:
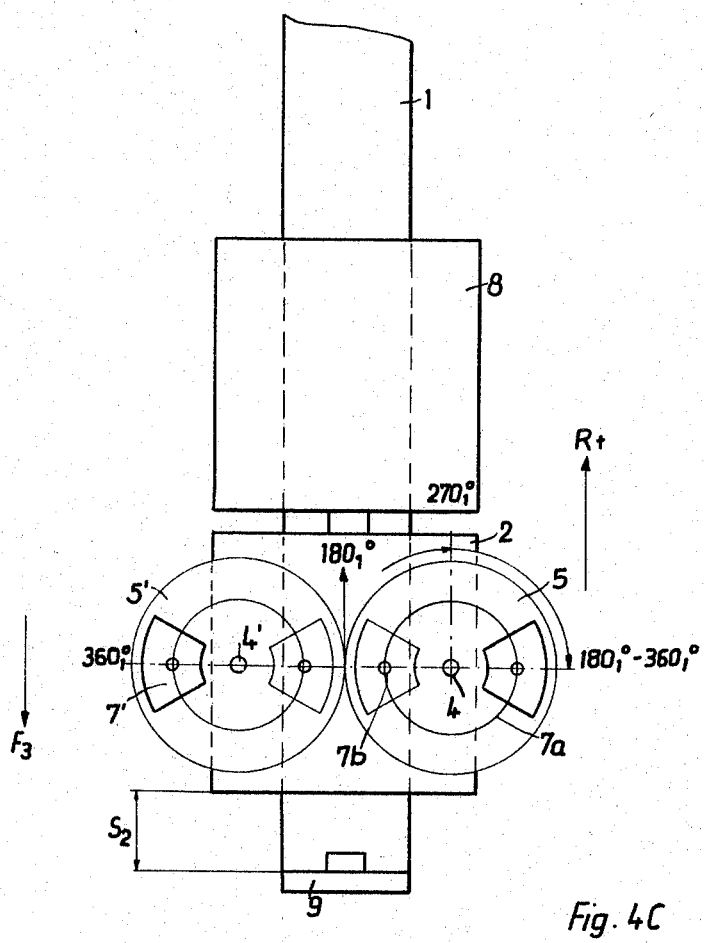
Figure 4D:
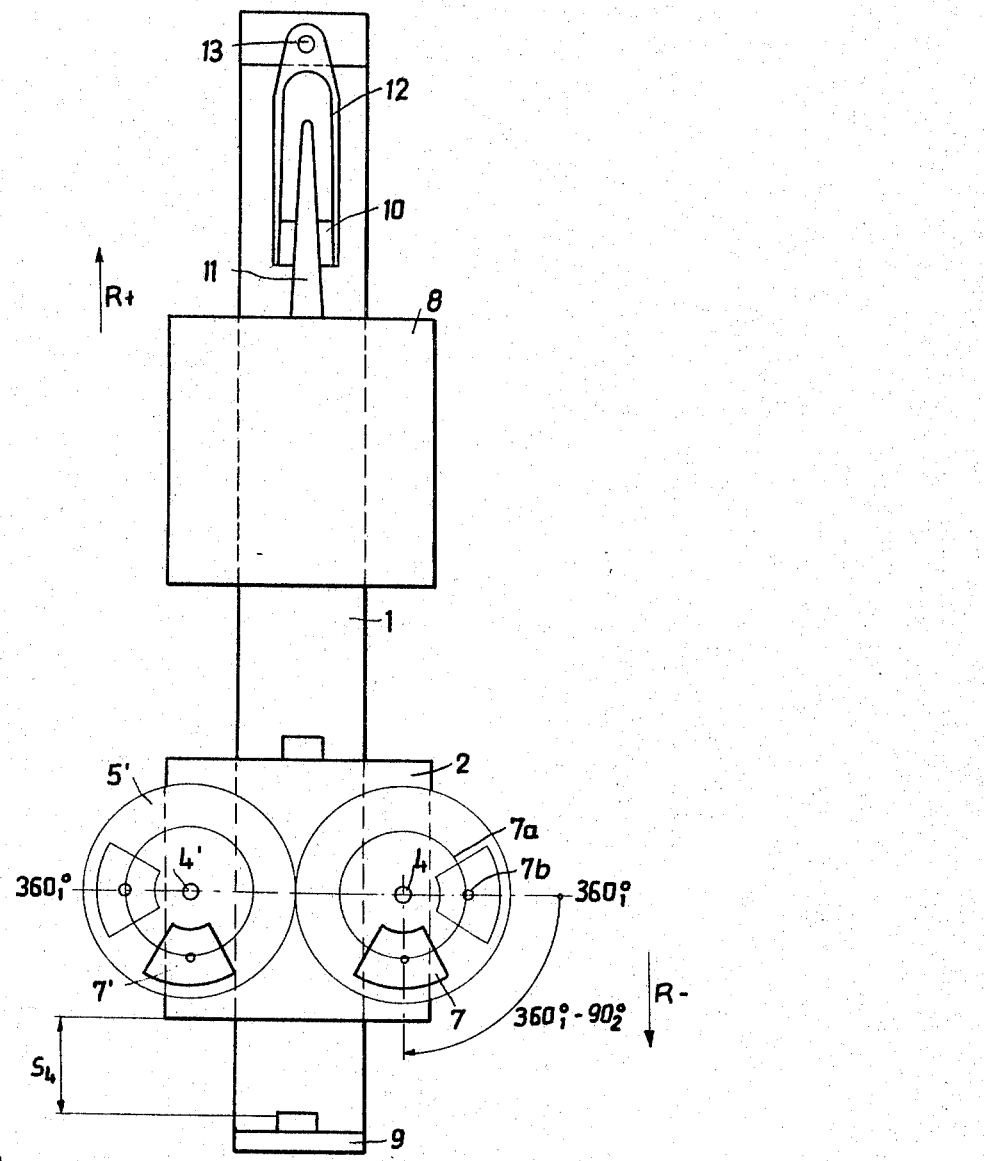

The preferred form of the inventive device will now be decribed with reference to the drawings, in which
FIGURE 1 shows a top view.
FIGURE 2 shows a side view.
FIGURE 3 shows a sectional view on the line I–II of FIGURE 1.
FIGURES 4a, 4b, 4c and 4d show diagrammatically the operation of the device.

As shown in FIGURES 1, 2 and 3, the device comprises a horizontal rail 1 along which two carriages 2 and 8 run freely on bearing-equipped flanged wheels 3. The carriage 2 is provided with two equal masses 7 and 7' which revolve about axles 4 and 4' respectively which axles are positioned at right angles to the horizontal rails. Suitably the masses 7 and 7' are weighted segments of two identical large wheels 5 and 5' which are mounted horizontally on the axles 4 and 4' respuectively. The wheels 5 and 5' are connected by meshing gears 6 so that when one wheel revolves in a clockwise direction the other revolves in a counterclockwise direction. The wheels 5 and 5' are set in motion by a pull tape 22, which can be pulled by manual or mechanical means. The tape 22 is fastened to the wheel 5 by a pin 23, which is loosely inserted into the wheel so that it will fall out and detach the tape once the initial pull has been transmitted to the wheel.

The rail 1 is provided at one end with a buffer or stop 9, to prevent travel of the carriage 2 from the position shown in the drawing in the direction R−. At its other end, the rail 1 is provided with a suitable motion-damping stop member such as the spring-clip 12, into which a tapered rod 11 attached to the carriage 8 can enter to stop motion of the carriage 8 in the direction R+.

Suitable measuring devices are provided to measure the velocity of rotation of the wheel 5 or 5' and the linear acceleration of the carriage 8. In the preferred embodiment illustrated these measuring devices consist of tapes 18 and 19, which are attached to wheel 5' and carriage 8 respectively. Each of the tapes passes over a marking device 16 which is provided with knives or pens 17 which are adapted to mark the tape. The knives or pens are driven at a constant high speed by electric motors 15, so that they will mark the tapes a known number of times per second. By examining the distance between adjacent marks on the tape and the variation of distance between pairs of adjacent marks, the instantaneous velocity and acceleration of the tape over the marking device, and hence of the wheel 5' on the carriage 8, can be calculated.

In conducting an experiment to verify physical principles with the device, the student or demonstrator first arranges the apparatus as shown in FIGURES 1 and 3 and starts the electric motors 15 which control the marking devices 16. He then gives a sharp manual pull to the tape 22, causing the wheels 5 and 5' to rotate in the direction of the arrows in FIGURE 1 and the weight segments 7 and 7' to revolve about the axes 4 and 4'. Initially, the pull on the tape 22 and the unbalanced centrifugal force caused by the movement of both weight segments 7 and 7' in a rearward direction creates a net force $F_1$ in the direction R− (see FIGURE 4a), but no motion results from this force because of the stop 9. As the wheels 5 continue to rotate (FIGURE 4b), a net force $F_2$ is created in the direction R+. This causes movement of both carriages 2 and 8 in the direction R+. However, as wheels 5 and 5' with their weight segments continue to rotate (FIGURE 4c), their unbalanced centrifugal force creates a net force $F_3$ in the direction R−, which stops the motion of the carriage 2 and may even cause it to move in the direction R−. However, the carriage 8 continues to move in the direction R+ until it either decelerates to a stop or is caught by the motion damping stop member 12.

From the marks made on tapes 18 and 19, the student can calculate instantaneous velocity and acceleration of both the weight segments 7 and 7' and the carriage 8, and demonstrates the energy transfer between these two elements. It is then possible to repeat the procedure with new weight segments 7 and 7' having a different value from those used the first time, to verify the energy absorption due to friction in the system. If the experiment is performed by students at a low educational level, who cannot interpret the marks on the tapes, it is possible to eliminate the tapes and marking devices completely. The experiment can then be done as a qualitative demonstration only, or a spring gage or the like can be used to measure the pull on tape 22 and the distance of travel of carriage 8 along the rail 1 for different strengths of pull can be noted. In such a case, the motion-damping stop 12 would of course not be used.

The foregoing is a description of a preferred embodiment of the invention by way of example only and the invention is not limited to the specific features shown but contemplates all such variations as come within the spirit of the invention as defined by the following claims.

The embodiments of the invention in which an exclusive property or privilege is claimed are defined as follows:

1. A device for the interconversion of energy forms which comprises
    a horizontal path
    a first carriage adapted to move along said path in either of two opposite directions with relatively little friction
    a stop member rigidly secured to said path, a first end of said first carriage being initially positioned adjacent to said stop member, whereby to prevent the movement of said first carriage in a first one of said two directions,
    two equal masses mounted upon said first carriage for free revolution relative to said carriage in a horizontal plane about centres of revolution lying in a line perpendicular to said two opposite directions, said centres of revolution being spaced so that said two masses have equal, non-intersecting, circles of revolution, said two masses being connected by gearing whereby when one mass revolves about its centre of revolution in a clockwise direction the other mass revolves about its center of revolution in a counter-clockwise direction with a velocity equal to that of the first mass.
    a second carriage adapted to move along said path in either of said two opposite directions, said second carriage being initially positioned adjacent to the end of said first carriage remote from said first end, and
    energy supplying means capable of initiating revolution of at least one of said two masses.

2. A device as claimed in claim 1, in which velocity and acceleration measuring means are attached to said second carriage and at least one of said equal masses.

3. A device as claimed in claim 2, in which said velocity and acceleration measuring means are tapes attached to said second carriage and at least one of said equal masses, said tapes passing in contact with marking devices adapted to mark said tapes at discrete time intervals.

4. A device as claimed in claim 1, in which said equal masses are weighted portions of identical wheels mounted for horizontal rotation about said centres of revolution.

5. A device as claimed in claim 1, in which said energy supplying means is a tape adapted to be manually grasped and pulled.

References Cited

UNITED STATES PATENTS

| | | | |
|---|---|---|---|
| 1,807,615 | 6/1931 | Behr | 35—19 X |
| 1,824,487 | 9/1931 | Klopsteg | 35—19 |
| 1,826,180 | 10/1931 | Klopsteg | 35—19 |

EUGENE R. CAPOZIO, *Primary Examiner.*

H. S. SKOGQUIST, *Assistant Examiner.*